(12) United States Patent
Farahati et al.

(10) Patent No.: US 10,975,919 B2
(45) Date of Patent: Apr. 13, 2021

(54) LASER ETCHING OF PATTERNS ON A SURFACE FOR FRICTION MATERIAL ADHESION

(71) Applicant: Schaeffler Technologies AG & Co. KG, Herzogenaurach (DE)

(72) Inventors: Rashid Farahati, Copley, OH (US); Sharan Rudra, Wooster, OH (US); Olusanmi Adeniran, Wooster, OH (US); Maxim Schikowez, Offenburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 250 days.

(21) Appl. No.: 15/913,310

(22) Filed: Mar. 6, 2018

(65) Prior Publication Data

US 2019/0277344 A1 Sep. 12, 2019

(51) Int. Cl.
*F16D 13/64* (2006.01)
*B23K 26/364* (2014.01)
(Continued)

(52) U.S. Cl.
CPC ............ *F16D 13/64* (2013.01); *B23K 26/364* (2015.10); *F16D 13/46* (2013.01); *F16H 45/02* (2013.01);
(Continued)

(58) Field of Classification Search
CPC .. F16D 13/64; F16D 13/46; F16D 2250/0038; F16D 2250/0069;
(Continued)

(56) References Cited

U.S. PATENT DOCUMENTS

| 5,899,310 A | 5/1999 | Mizuta |
| 2007/0163852 A1* | 7/2007 | Arhab .................... B23K 20/12 192/3.29 |

(Continued)

FOREIGN PATENT DOCUMENTS

JP 10299798 A 11/1998

OTHER PUBLICATIONS

International Search Report and Written Opinion of corresponding PCT application.

*Primary Examiner* — Mark A Manley
(74) *Attorney, Agent, or Firm* — Davidson, Davidson & Kappel, LLC

(57) ABSTRACT

A method of etching a surface of a metal clutch part for bonding of friction includes etching, by a laser, a plurality of craters into a specified etching area of the surface of the metal clutch part. The specified etching area is defined by an outer circumference and an inner circumference. The craters define an etch pattern on the surface. The laser follows a predefined path during the etching to generate the etch pattern. The path is one of a plurality of radially aligned and circumferentially overlapping figure eights, each of the figure eights extending from the outer circumference of the specified etching area to the inner circumference of the specified etching area; a plurality of rows of circumferentially aligned and radially overlapping figure eights extending from the outer circumference of the specified etching area to the inner circumference of the specified etching area; or a plurality of circumferentially spaced radially extending lines extending from the outer circumference of the specified etching area to the inner circumference of the specified etching area. The method also includes bonding the friction material to the metal clutch part on the etch pattern.

19 Claims, 5 Drawing Sheets

(51) Int. Cl.
*F16D 13/46* (2006.01)
*F16H 45/02* (2006.01)

(52) U.S. Cl.
CPC .............. *F16H 2045/0221* (2013.01); *F16H 2045/0294* (2013.01)

(58) Field of Classification Search
CPC . F16D 2300/10; B23K 26/364; B23K 26/362; F16H 45/02; F16H 2045/0294; F16H 2045/0221; F16H 2045/0289; F16H 2045/0226
See application file for complete search history.

(56) References Cited

U.S. PATENT DOCUMENTS

| | | |
|---|---|---|
| 2011/0220441 A1 | 9/2011 | Zhang |
| 2015/0276034 A1 | 10/2015 | Farahati et al. |
| 2016/0281810 A1* | 9/2016 | Terauchi .................. B32B 3/30 |
| 2017/0219075 A1 | 8/2017 | Farahati et al. |
| 2017/0276191 A1 | 9/2017 | Farahati et al. |
| 2018/0372664 A1* | 12/2018 | Buttner .................. B23K 26/40 |

* cited by examiner

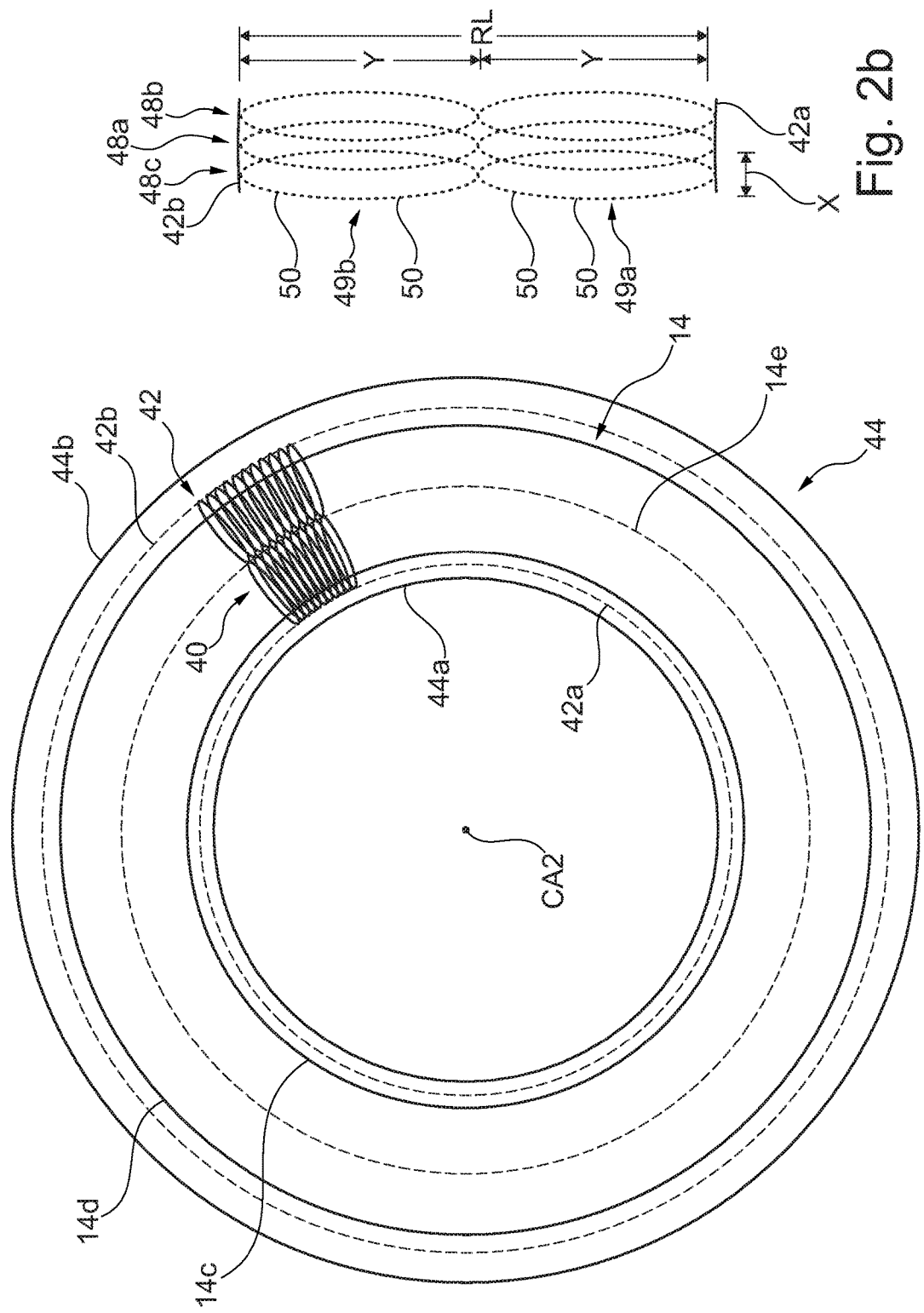

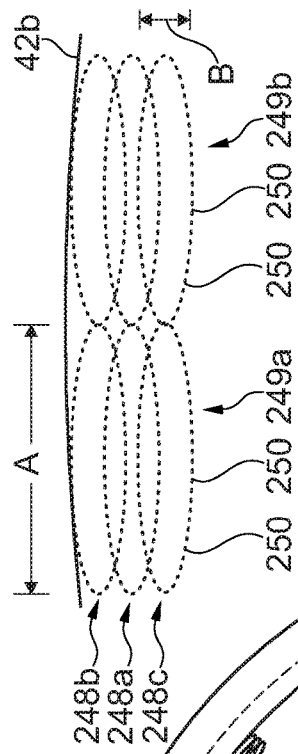
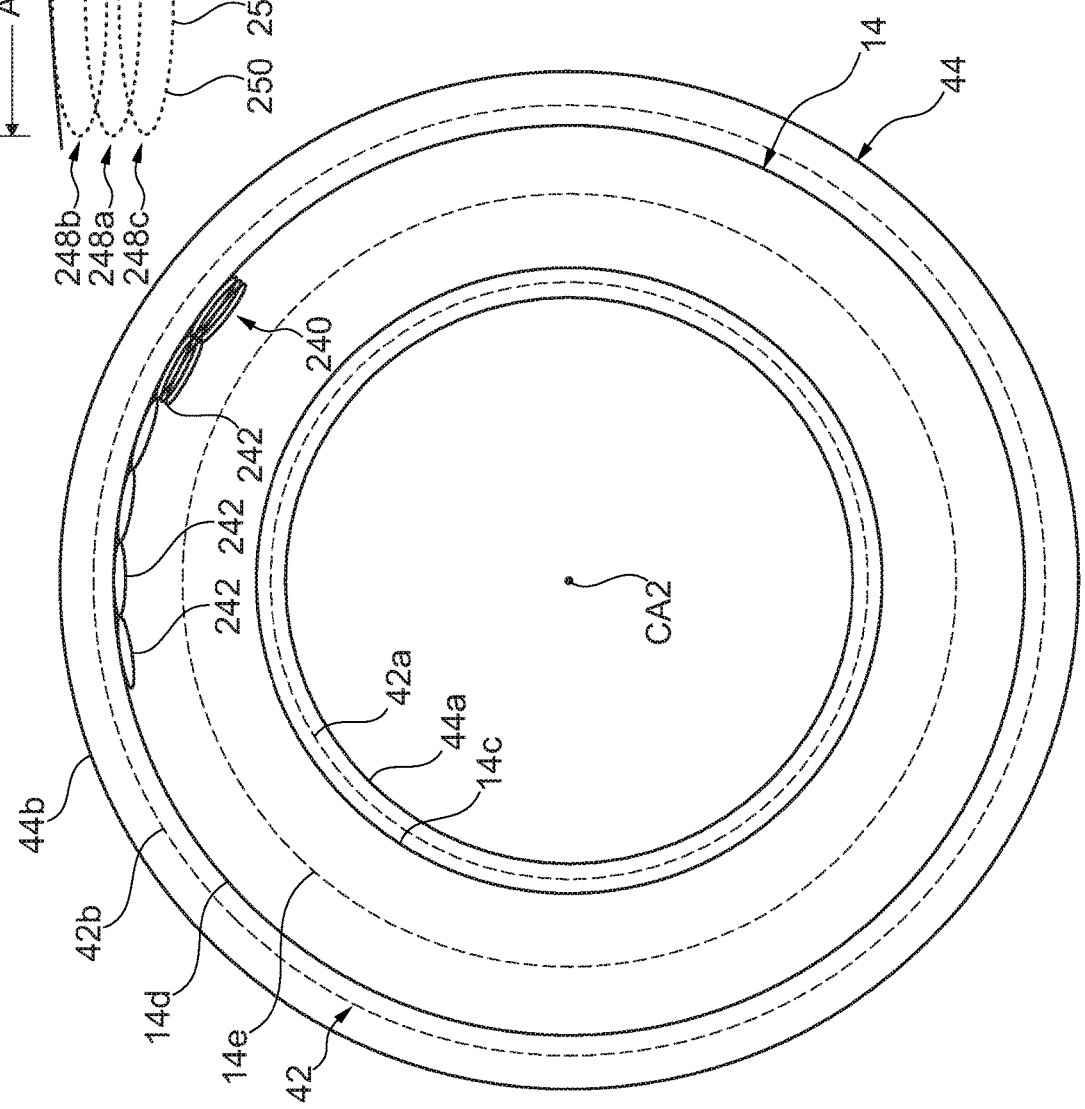

LASER ETCHING OF PATTERNS ON A SURFACE FOR FRICTION MATERIAL ADHESION

The present disclosure relates generally a method of roughening a surface of a metal part for adhesion of material and more specifically to a method of laser etching a metal clutch part for adhesion of wet friction material.

BACKGROUND

The friction material in wet-type friction clutches generally operates in an oil submerged environment and is often paper-based material used to form friction material rings.

U.S. Pub. 2015/0276034 discloses a method of laser etching a metal clutch part for adhesion of wet friction material. The method of laser etching in U.S. Pub. 2015/0276034 is hereby incorporated by reference herein. U.S. Pub. 2015/0276034 discloses one possible etch pattern.

SUMMARY OF THE INVENTION

A method of etching a surface of a metal clutch part for bonding of friction is provided. The method includes etching, by a laser, a plurality of craters into a specified etching area of the surface of the metal clutch part. The specified etching area is defined by an outer circumference and an inner circumference. The craters define an etch pattern on the surface. The laser follows a predefined path during the etching to generate the etch pattern. The path is one of a plurality of radially aligned and circumferentially overlapping figure eights, each of the figure eights extending from the outer circumference of the specified etching area to the inner circumference of the specified etching area; a plurality of rows of circumferentially aligned and radially overlapping figure eights extending from the outer circumference of the specified etching area to the inner circumference of the specified etching area; or a plurality of circumferentially spaced radially extending lines extending from the outer circumference of the specified etching area to the inner circumference of the specified etching area. The method also includes bonding the friction material to the metal clutch part on the etch pattern.

In embodiments of the method, the path is the plurality of radially aligned and circumferentially overlapping figure eights. Each of the figure eights may include a first section and a second section each having a minor diameter and a major diameter, the ratio of the major diameter to the minor diameter being at least 3:1. In embodiments of the method, the path is the plurality of rows of circumferentially aligned and radially overlapping figure eights. Each of the figure eights may include a first section and a second section each having a minor diameter and a major diameter, the ratio of the major diameter to the minor diameter being at least 3:1. In embodiments of the method, the path is the plurality of circumferentially spaced radially extending lines. The craters may cover 30 to 70% of the specified etching area. The craters may each have a maximum diameter of 65 µm to 110 µm. The craters may each have a depth of 2 to 8 µm. Each of the craters is spaced less than 200 µm from a nearest one of the craters.

A method of etching a surface of a metal clutch part for bonding of friction material is also provided. The method includes etching, by a laser, a plurality of craters into a specified etching area of the surface of the metal clutch part. The specified etching area is defined by an outer circumference and an inner circumference. The craters define an etch pattern on the surface. The laser follows a predefined path during the etching to generate the etch pattern such that the craters cover 30 to 70% of the specified etching area. The method also includes bonding the friction material to the metal clutch part on the etch pattern.

In embodiment of the method, the craters each have a maximum diameter of 65 jam to 110 µm. The craters may each have a depth of 2 to 8 µm. Each of the craters is spaced less than 200 µm from a nearest one of the craters.

A clutch assembly for a motor vehicle drive train is also provided. The clutch assembly includes a metal clutch part having a surface including a plurality of laser etched craters in an etching area of the surface. The specified etching area is defined by an outer circumference and an inner circumference and the craters define an etch pattern on the surface. The etch pattern includes a plurality of radially aligned and circumferentially overlapping figure eights, each of the figure eights extending from the outer circumference of the specified etching area to the inner circumference of the specified etching area; a plurality of rows of circumferentially aligned and radially overlapping figure eights extending from the outer circumference of the specified etching area to the inner circumference of the specified etching area; or a plurality of circumferentially spaced radially extending lines extending from the outer circumference of the specified etching area to the inner circumference of the specified etching area. The clutch assembly also includes a friction material bonded to the metal clutch part on the etch pattern.

In embodiment of the clutch assembly, the pattern includes the plurality of radially aligned and circumferentially overlapping figure eights. In embodiment of the clutch assembly, the pattern includes the plurality of rows of circumferentially aligned and radially overlapping figure eights. In embodiment of the clutch assembly, the pattern includes the plurality of circumferentially spaced radially extending lines. The plurality of craters may cover 30 to 70% of the specified etching area.

BRIEF DESCRIPTION OF THE DRAWINGS

The present disclosure is described below by reference to the following drawings, in which:

FIG. 1b shows an enlarged view of the clutch assembly of FIG. 1a;

FIGS. 2a and 2b illustrate a first etch pattern in accordance with the present disclosure where the laser followed a path of a plurality of radially aligned and circumferentially overlapping figure eights;

FIGS. 4a and 4b illustrate a third etch pattern in accordance with the present disclosure where the laser followed a path of a plurality of rows circumferentially aligned and radially overlapping figure eights.

DETAILED DESCRIPTION

The present disclosure provides a laser etch process as with an optimal cycle time and crater arrangement to guarantee sufficient bonding adhesion of friction material to the surface of a metal clutch part. No known laser etch pattern to optimize crater distribution has been defined in the industry. Laser markings before now have been defined by laser input power and frequency, without attention to the effect of laser patterns in optimizing crater dimensions; hence, bonding adhesion. The 2D etch patterns provided by the present disclosure allow an efficient travel of laser pulse to create the required crater distribution.

Figure 1A:
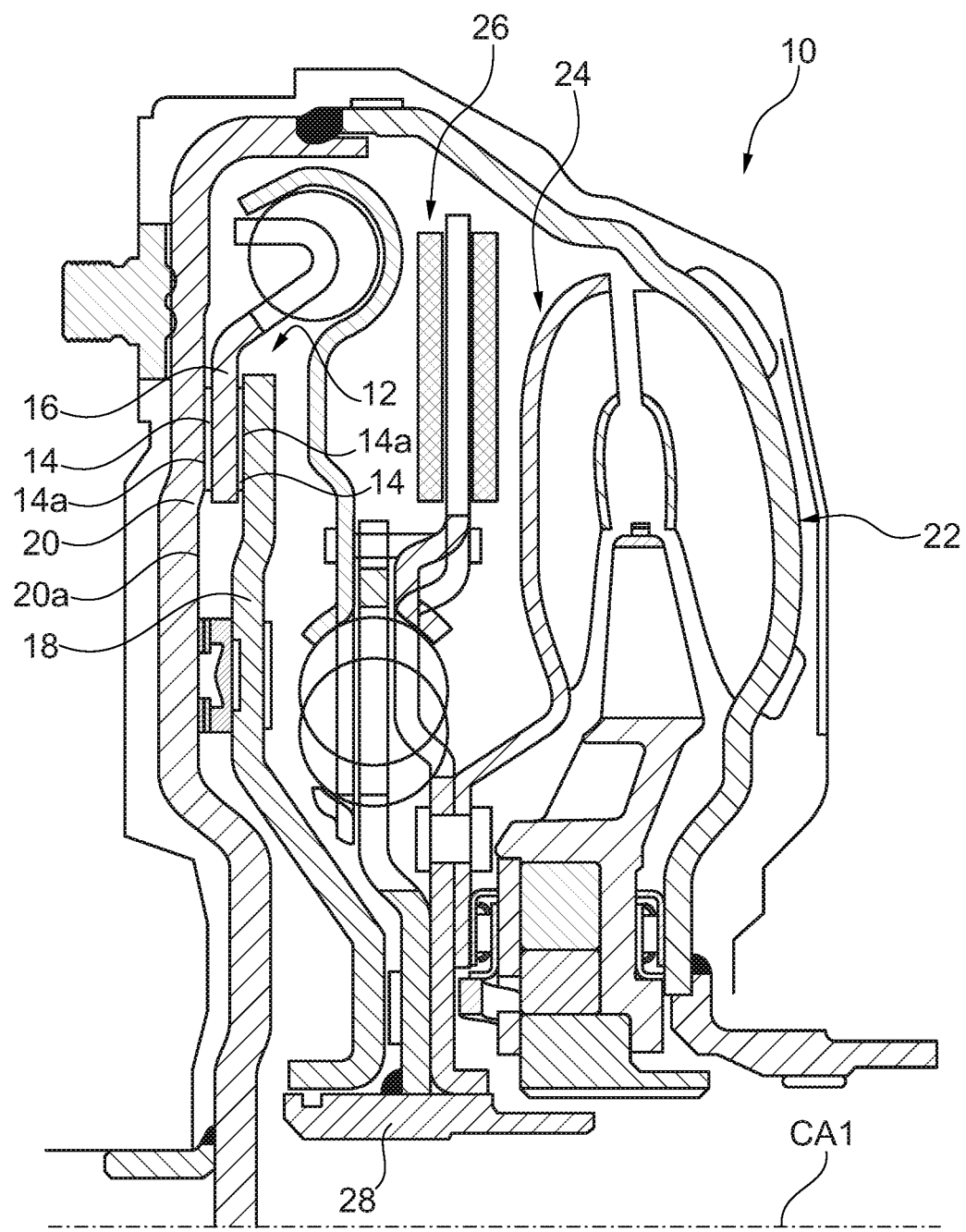
FIG. 1a shows a torque converter including a clutch assembly formed in accordance with an embodiment of the present disclosure.

FIG. 1a shows a torque converter 10 including a lockup clutch assembly 12 including wet friction material 14 bonded to both sides of a metal part in the form of a clutch plate 16. Torque converter 10 is designed to operate in a known manner, rotating about a center axis CA1 during operation. Unless otherwise specified, the terms radially, circumferentially and axially are used throughout this disclosure in reference to center axis CA1 (or center axis CA2 mentioned below, which is coincident with center CA1 when the clutch assemblies are used in a torque converter). A piston 18 of lockup clutch assembly 12 forces clutch plate 16 against an inside surface 20a of a front cover 20 of torque converter 10. Piston 18 axially contacts the an exterior radially extending surface 14a of the rear piece of wet friction material 14 to force the exterior radially extending surface 14a on the front piece of wet friction material 14 against inside surface 20a of front cover 20. The axial forcing of clutch plate 16 against front cover 20 by piston 18 locks the lockup clutch assembly 12 such that a torque path to a transmission input shaft bypasses an impeller 22 and a turbine 24 of torque converter 10, and instead flows from front cover 20 to clutch plate 16 and through a damper assembly 26 to a transmission input shaft that is connected to an output hub 28 of torque converter 10.

Figure 1B:
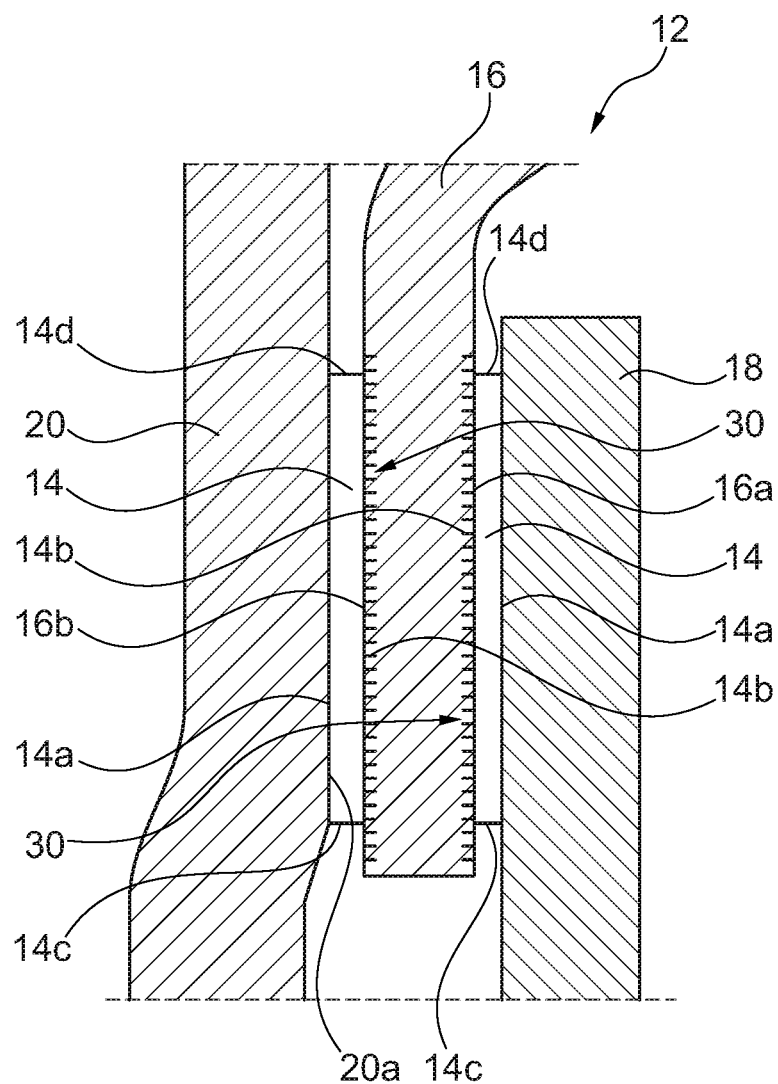

FIG. 1b shows an enlarged view of lockup clutch assembly 12. A radially extending connection surface 14b of each piece of friction material 14 is bonded to clutch plate 16. More specifically, the connection surface 14b of the rear piece of friction material 14 is bonded to a rear-facing radially extending surface 16a of clutch plate 16 by adhesive and the connection surface 14b of the front piece of friction material 14 is bonded to a front-facing radially extending surface 16b of clutch plate 16 by adhesive. Both of surfaces 16a, 16b are provided with etchings 30 formed therein for promoting a strong adhesion connection between friction material 14 and clutch plate 16. In the embodiment shown in FIG. 1b, etchings 30 begin radially inside of an inner diameter edge 14c of friction material 14 and extend radially along friction material 14 radially outside of an outer diameter edge 14d of friction material 14. Etchings 30 are formed using a laser, by pulsing the laser as the laser traverses across the respective surface 16a, 16b. The pulsing of the laser ablates surfaces 16a, 16b to form craters in surfaces 16a, 16b that defines etchings 30. In one preferred embodiment, both pieces of friction material 14 are formed as rings extending about center axis CA1 of torque converter 10 (FIG. 1a), and accordingly, the etchings define a ring-shaped pattern on each of surfaces 16a, 16b.

Embodiments of the present disclosure, which are discussed in further detail below, cover a specified etching area with plurality of spaced craters. In preferred embodiments, the craters cover 30 to 70% of the specified etching area. In preferred embodiments, the craters each have a maximum diameter of 65 µm to 110 µm, the craters each have a depth of 2 to 8 µm and each of the craters is spaced less than 200 µm from the nearest crater. Maximum diameter is defined as the greatest distance between two edge points of a crater as measured at the respective surface 16a, 16b.

FIGS. 2a and 2b illustrate one etch pattern 40 in accordance with the present disclosure where the laser followed a path of a plurality of radially aligned and circumferentially overlapping figure eights, each of the figure eights extending from an outer circumference 42b of a specified etching area 42 to an inner circumference 42a of the specified etching area 42. FIG. 2a illustrates a portion of an etch pattern 40 in a specified etching area 42 defined between inner circumference 42a and outer circumference 42b. Etch pattern 40 is formed on a metal clutch part 44 that extends between an inner circumference 44a and an outer circumference 44b. After etch pattern 40 is created on the surface of metal clutch part 44 by laser pulsing, a piece of friction material 14 shaped as a ring bonded to metal clutch part 44 coincident with etch pattern 40. Friction material ring 14 extends radially between the inner diameter edge 14c, which defines an inner circumference of friction material 14, and outer diameter edge 14d, which defines an outer circumference of friction material 14 that is concentric with inner diameter edge 14c. A midpoint circle 14e, which is concentric with edges 14c, 14d, defines points halfway between edges 14c, 14d. FIG. 2b illustrates an enlarged portion of etch pattern 40, illustrating two figure eight pattern sections 48a, 48b generated by laser etching.

As illustrated by FIG. 2a, a single figure eight of etch pattern 40 extends radially from inner circumference 42a to outer circumference 42b of specified etching area 42. Accordingly, the entire radial extent of etch pattern 40 is defined by a plurality of singular figure eighths that extend radially from inner circumference 42a to outer circumference 42b of specified etching area 42. Each figure eight circumferentially overlaps with the two circumferentially adjacent figure eights, i.e., one figure eight in a first circumferential direction and one figure eight in a second circumferential direction that is opposite of the first circumferential direction. Accordingly, etch pattern 40 consists of singular circumferentially overlapping figure eights that extend between inner circumference 42a and outer circumference 42b.

FIG. 2b illustrates a section of pattern 40 with a first figure eight 48a being overlapped by a second figure eight 48b that is directly circumferentially adjacent to figure eight 48a in the first circumferential direction and overlapped by a third figure eight 48c that is directly circumferentially adjacent to figure eight 48a in the second circumferential direction. It is noted that figure eights 48b, 48c would also each be overlapped by another directly adjacent respective figure eight, but these figures eights are omitted from FIG. 2b for clarity. In FIG. 2b, each figure eight 48a to 48c is illustrated as two sections 49a, 49b-a radially inner section 49a and a radially outer section 49b—that are joined together at their ends and are each shaped as ellipses. However, the figure eights may have an orientation of the figure eight as shown in U.S. Pub. 2015/0276034, with a radially outer end of inner section 49a being pointed and a radially inner end of outer section 49b being pointed. Sections 49a, 49b each have a major diameter Y and a minor diameter X, with the major diameter Y being greater than the minor diameter X, with ratio of Y to X being at least 3:1, a preferably at least 5:1. In one preferred embodiment, sections 49a, 49b have the same minor diameter X and the same major diameter Y, but in other embodiments sections 49a, 49b may have different minor diameters X and/or major diameters Y. Regardless, the major diameters Y of sections 49a, 49b added together equal a radial length RL of specified etching area 42, which is the distance between inner circumference 42a and outer circumference 42b. As illustrated in FIG. 2b, figure eights 48a to 48c are each formed by a plurality of craters 50 spaced apart from each other. While craters 50 are illustrated as having a substantially rectangular shape, craters 50 generally have a more rounded shape.

Figure 3:
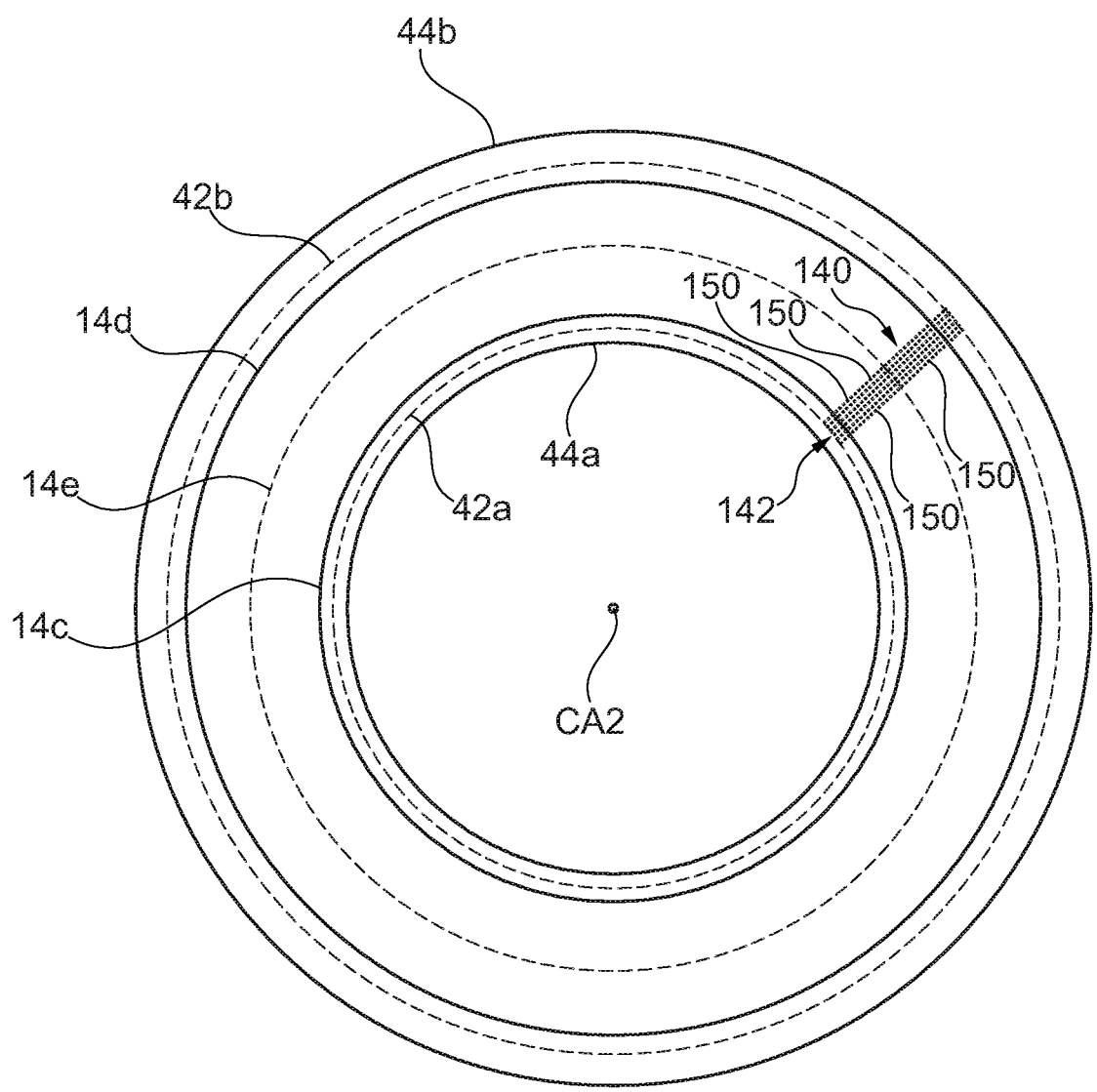
FIG. 3 illustrates a second etch pattern in accordance with the present disclosure where the laser followed a path of a plurality of circumferentially spaced radially extending lines.

FIG. 3 illustrates another etch pattern 140 in accordance with the present disclosure where the laser followed a path of a plurality of circumferentially spaced radially extending lines extending from the outer circumference 42b of the specified etching area 42 to the inner circumference 42a of the specified etching area 42. Etch pattern 140 is formed on metal clutch part 44, which extends between an inner circumference 44a and an outer circumference 44b. After etch pattern 140 is created on the surface of metal clutch part 44 by laser pulsing, a piece of friction material 14 shaped as a ring bonded to metal clutch part 44 coincident with etch pattern 40. Friction material ring 14 extends radially between the inner diameter edge 14c, which defines an inner circumference of friction material 14, and outer diameter edge 14d, which defines an outer circumference of friction material 14 that is concentric with inner diameter edge 14c. A midpoint circle 14e, which is concentric with edges 14c, 14d, defines points halfway between edges 14c, 14d.

As illustrated by the section of etch pattern 140 shown FIG. 3 (it should be understood that an entire of specified etching area 42 is etched the same manner as the section of etch pattern 140 shown), etch pattern 140 is formed by a plurality of circumferentially spaced lines 142 extending radially from inner circumference 42a to outer circumference 42b of specified etching area 42, with four such lines 142 being illustrate in FIG. 3. Accordingly, the entire radial extent of etch pattern 140 is defined by a plurality of singular lines that extend radially from inner circumference 42a to outer circumference 42b of specified etching area 42. As illustrated in FIG. 3, radially extending lines 142 are each formed by a plurality of craters 150 spaced apart from each other. As similarly noted with respect to FIG. 2b, while craters 150 are illustrated as having a substantially rectangular shape, craters 150 generally have a more rounded shape. During etching, the laser follows a path directly radially outward from inner circumference 42a to outer circumference 42b of specified etching area 42, pulsing to create craters 150.

FIGS. 4a and 4b illustrate another etch pattern 240 in accordance with the present disclosure where the laser followed a path of a plurality of rows circumferentially aligned and radially overlapping figure eights. FIG. 4a illustrates a portion of an etch pattern 240 in a specified etching area 42 defined between an inner circumference 42a and an outer circumference 42b. Etch pattern 240 is formed on a metal clutch part 44 that extends between an inner circumference 44a and an outer circumference 44b. After etch pattern 40 is created on the surface of metal clutch part 44 by laser pulsing, a piece of friction material 14 shaped as a ring bonded to metal clutch part 44 coincident with etch pattern 40. Friction material ring 14 extends radially between the inner diameter edge 14c, which defines an inner circumference of friction material 14, and outer diameter edge 14d, which defines an outer circumference of friction material 14 that is concentric with inner diameter edge 14c. A midpoint circle 14e, which is concentric with edges 14c, 14d, defines points halfway between edges 14c, 14d. FIG. 4b illustrates an enlarged portion of etch pattern 40, illustrating three figure eight pattern sections 248a, 248b, 248c from three different rows generated by laser etching.

As illustrated by FIG. 4a, a plurality of rows of circumferentially extending figure eights of etch pattern 240 are formed between inner circumference 42a and outer circumference 42b of specified etching area 42. Each figure eight circumferentially abuts the two circumferentially adjacent figure eights, i.e., one circumferential end of the figure eight abuts the adjacent figure eight in a first circumferential direction and the other circumferential end of the figure eight abuts the adjacent figure eight in a second circumferential direction. Each figure eight radially overlaps with the two radially adjacent figure eights, i.e., one figure eight in a first radial direction and one figure eight in a second radial direction that is opposite of the first radial direction. Accordingly, etch pattern 240 consists of circumferentially overlapping figure eights that extend between inner circumference 42a and outer circumference 42b.

FIG. 4b illustrates a section of pattern 240 with a first figure eight 248a being overlapped by a second figure eight 248b that is directly radially adjacent to figure eight 48a in the first circumferential direction and overlapped by a third figure eight 248c that is directly radially adjacent to figure eight 248a in the second circumferential direction. It is noted that figure eights 248c would also each be overlapped by another directly adjacent respective figure eight, but this figure eight is omitted from FIG. 4b for clarity. In FIG. 4b, each figure eight 248a to 248c is illustrated as two sections 249a, 249b that are joined together at their circumferential ends and are each shaped as ellipses. However, the figure eights may have an orientation in which one or both of circumferential ends of sections 249a, 249b are pointed. Sections 249a, 249b each have a major diameter A and a minor diameter B, with the major diameter A being greater than the minor diameter B, with ratio of A to B being at least 3:1, a preferably at least 5:1. In one preferred embodiment, sections 249a, 249b have the same minor diameter B and the same major diameter A, but in other embodiments sections 249a, 249b may have different minor diameters B and/or major diameters A. As illustrated in FIG. 4b, figure eights 248a to 248c are each formed by a plurality of craters 250 spaced apart from each other. While craters 250 are illustrated as having a substantially rectangular shape, craters 250 generally have a more rounded shape. In one preferred efficient embodiment, the laser moves about center axis CA2 to form a single ring of figure eights, then moves radially to form another single ring of figure eights—i.e., the laser forms figure eight 248b, rotates entirely about center axis to form other figure eights at the same radial distance from center axis CA2 as figure eight 248b, then moves radially inward to form figure eight 248a.

Patterns 40, 140, 240 are more efficient than the pattern disclosed in U.S. Pub. 2015/0276034.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

What is claimed is:

1. A method of etching a surface of a metal clutch part for bonding of friction material comprising: etching, by a laser, a plurality of craters into a specified etching area of the surface of the metal clutch part, the specified etching area being defined by an outer circumference and an inner circumference, the craters defining an etch pattern on the surface, the laser following predefined path during the etching to generate the etch pattern, the path being one of:
a plurality of radially aligned and circumferentially overlapping figure eights, each of the figure eights extending from the outer circumference of the specified etching area to the inner circumference of the specified etching area;

a plurality of rows of circumferentially aligned and radially overlapping figure eights extending from the outer circumference of the specified etching area to the inner circumference of the specified etching area; or a plurality of circumferentially spaced radially extending lines extending from the outer circumference of the specified etching area to the inner circumference of the specified etching area;

and bonding the friction material to the metal clutch part only on an area that includes the etch pattern and no other etch pattern.

2. The method as recited in claim 1 wherein the path is the plurality of radially aligned and circumferentially overlapping figure eights.

3. The method as recited in claim 2 wherein each of the figure eights includes a first section and a second section each having a minor diameter and a major diameter, the ratio of the major diameter to the minor diameter being at least 3:1.

4. The method as recited in claim 1 wherein the path is the plurality of rows of circumferentially aligned and radially overlapping figure eights.

5. The method as recited in claim 4 wherein each of the figure eights includes a first section and a second section each having a minor diameter and a major diameter, the ratio of the major diameter to the minor diameter being at least 3:1.

6. The method as recited in claim 1 wherein the path is the plurality of circumferentially spaced radially extending lines.

7. The method as recited in claim 1 wherein the craters cover 30 to 70% of the specified etching area.

8. The method as recited in claim 1 wherein the etching and the bonding are performed such that the inner circumference of the specified etching area is radially inside of an inner diameter edge of the friction material or the outer circumference of the specified etching area is radially outside of an outer diameter edge of the friction material.

9. The method as recited in claim 1 wherein each of the craters is spaced less than 200 µm from a nearest one of the craters.

10. The method as recited in claim 7 wherein the craters each have a maximum diameter of 65 µm to 110 µm.

11. The method as recited in claim 7 wherein the craters each have a depth of 2 to 8 µm.

12. The method as recited in claim 7 wherein each of the craters is spaced less than 200 µm from a nearest one of the craters.

13. A clutch assembly for a motor vehicle drive train comprising:
a metal clutch part having a surface including a plurality of laser etched craters in an etching area of the surface, the specified etching area being defined by an outer circumference and an inner circumference, the craters defining an etch pattern on the surface, the etch pattern including:
a plurality of radially aligned and circumferentially overlapping figure eights, each of the figure eights extending from the outer circumference of the specified etching area to the inner circumference of the specified etching area;
a plurality of rows of circumferentially aligned and radially overlapping figure eights extending from the outer circumference of the specified etching area to the inner circumference of the specified etching area; or
a plurality of circumferentially spaced radially extending lines extending from the outer circumference of the specified etching area to the inner circumference of the specified etching area; and
a friction material bonded to the metal clutch part on the etch pattern such that the inner circumference of the specified etching area is radially inside of an inner diameter edge of the friction material or the outer circumference of the specified etching area is radially outside of an outer diameter edge of the friction material.

14. The clutch assembly as recited in claim 13 wherein the pattern includes the plurality of radially aligned and circumferentially overlapping figure eights.

15. The clutch assembly as recited in claim 13 wherein the pattern includes the plurality of rows of circumferentially aligned and radially overlapping figure eights.

16. The clutch assembly as recited in claim 13 wherein the pattern includes the plurality of circumferentially spaced radially extending lines.

17. The clutch assembly as recited in claim 13 wherein the plurality of craters cover 30 to 70% of the specified etching area.

18. The clutch assembly as recited in claim 13 wherein each of the craters is spaced less than 200 µm from a nearest one of the craters.

19. The method as recited in claim 8 wherein the etching and the bonding are performed such that both the inner circumference of the specified etching area is radially inside of an inner diameter edge of the friction material and the outer circumference of the specified etching area is radially outside of an outer diameter edge of the friction material.

* * * * *